Patented Nov. 27, 1934

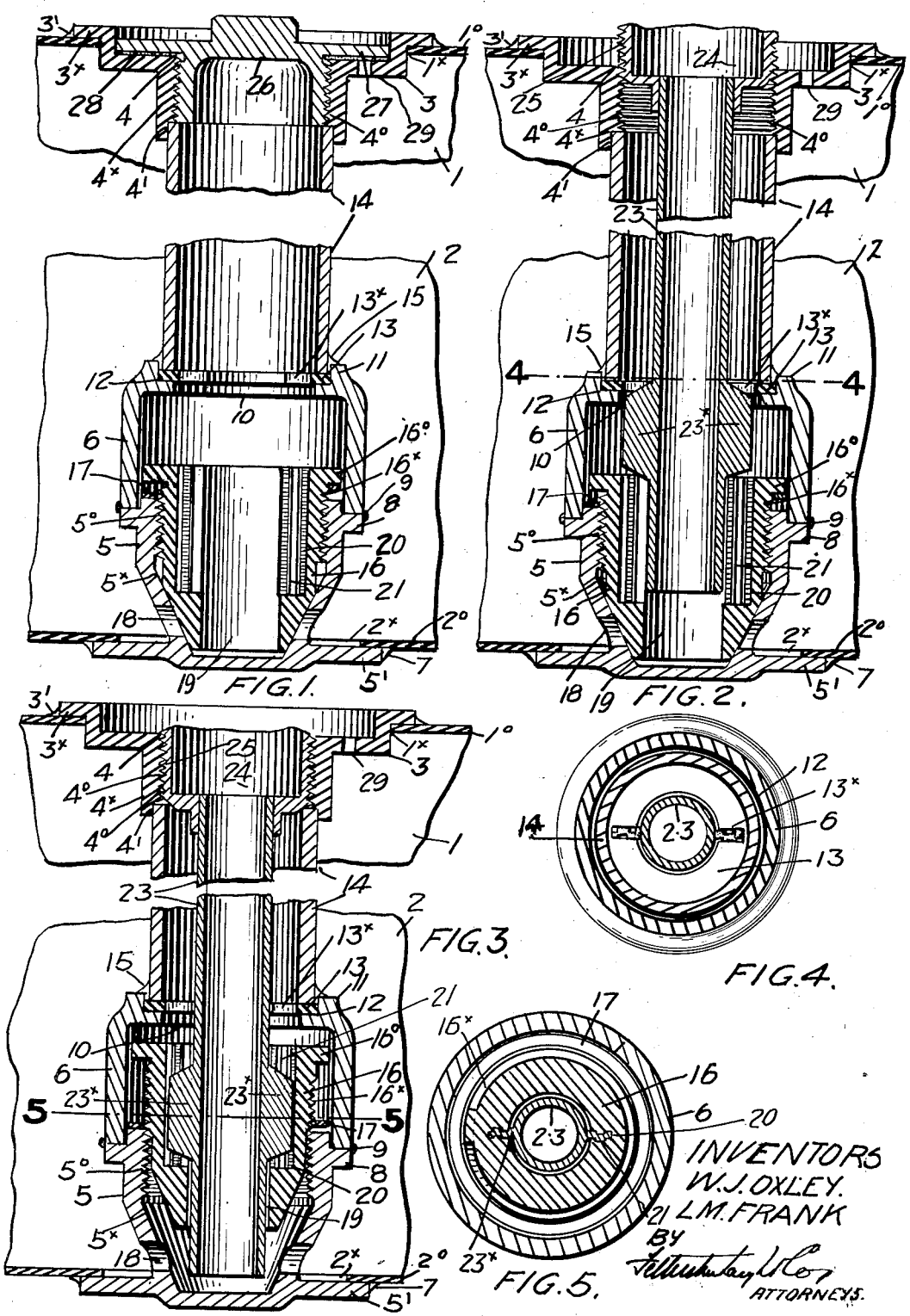

1,982,066

UNITED STATES PATENT OFFICE 1,982,066

CLOSURE FOR LIQUID FUEL TANKS AND BARRELS

William John Oxley, Willowdale, Ontario, and Leo Michael Frank, New Toronto, Ontario, Canada Application July 13, 1933, Serial No. 680,288

1 Claim. (Cl. 284—14)

Our invention relates to improvements in closures for liquid fuel tanks and barrels, and the object of the invention is to provide a closure which will prevent the refilling of the metal tank or barrel with a different grade of fuel or the injection of water or other fluid into the fuel by an unauthorized person, and it consists essentially of a fuel container having the usual filling orifices and an internally threaded cap secured in the orifice, a valve casing having a valve seat adjacent the bottom of the tank, a valve coacting with the valve seat, a tubular pump stem, a key seat, and key means for opening the valve operated by the insertion of the stem as the stem and valve engage and for closing the valve by the withdrawal of the stem.

Fig. 1 is a sectional view through our device intermediately broken away of its length and applied to fragmentary portions of a container and showing the parts in the normal position.

Fig. 2 is a similar view to Fig. 1 showing the pump inserted in position for opening the valve.

Fig. 3 is a similar view to Figs. 1 and 2 showing the valve in the open position.

Fig. 4 is a plan sectional view on line 4—4 Fig. 2.

Fig. 5 is a plan sectional view on line 5—5 Fig. 3.

In the drawing like characters of reference indicate corresponding parts in each figure.

1 and 2 are upper and lower fragmentary portions of a metal container such as is used for containing fuel oil. $1^x$ is an orifice formed in the upper wall $1^o$ of the container and $2^x$ is an orifice formed in the bottom wall $2^o$ of the container.

3 is a circular casting or cap having an external annular flange $3^x$ resting on the wall $1^o$ around the edge of the orifice $1^x$ and welded to said wall as indicated at 3' so that the recessed body of the casting depends through the orifice $1^x$, such recessed body being provided with a central orifice 4 around which depends an annular flange or sleeve $4^x$ threaded internally at $4^o$ and having an internal recess 4' at its lower end for a purpose which will hereinafter appear.

5 and 6 are members of a valve casing, the member 5 having a tapered seat $5^x$, the upper portion of the member being internally threaded as indicated at $5^o$ of the same pitch as the thread $4^o$ but reverse thereto. 5' is an annular flange formed at the bottom of the member 5 and welded as indicated at 7 to the outer face of the wall $2^o$ so that the casing member 5 is supported to extend through the orifice $2^x$ in vertical alignment with the casting 3. 8 is an annular flange which extends around the casting 5 and upon which is supported the upper casing member 6 to which it is welded as indicated at 9. The top of the member 6 is provided with a central orifice 10 and an annular flange 11 forming a recess 12.

13 is an annular washer fitting the recess 12. The washer 13 is provided with diametrically opposite slots $13^x$ extending from its internal periphery and forming guides as will hereinafter appear. 14 is a tube resting, at its lower end, upon the washer 13 and welded in the recess 12 as indicated at 15 and fitting at its upper end in the recess 4'.

16 is a valve cylindrical in form and provided with a tapered lower end corresponding in taper to the taper of the seat $5^x$. The valve 16 is also provided with an external thread $16^x$ engaging the thread $5^o$ of the casing. The valve 16 is further provided at its upper end with an annular flange $16^o$. 17 is a lock washer located between the flange $16^o$ and the upper edge of the casing member 5 and which is compressed as the valve 16 assumes its closed position.

18 are ports through which the oil or other fluid passes into or out of the container.

The valve 16 is provided with a central orifice 19 from which extend diametrically opposite slots 20 forming a key seat, the opposite walls of the slots being ribbed and grooved as at 21.

23 is a tubular stem provided at its upper end with pump mechanism or filling funnel, the lower end 24 of which is externally threaded as indicated at 25 to engage the thread $4^o$ of the cap 3. The stem 23 is provided with diametrically opposite key wings $23^x$ adapted to pass freely through the slots 13 and having their opposite faces ribbed and grooved to correspond to the ribbed and grooved faces of the slot walls 21.

26 is a closing plug which is threaded to engage the thread of the cap 3 and is provided with an annular flange 27 between which and the base of the cap recess fits a packing washer 28. 29 is an air vent.

When it is desired to fill the container, the plug 26 is unscrewed and the funnel or pump stem 23 inserted, the key wings $23^x$ passing freely through the slots $13^x$ of the washer 13. The slots $13^x$ are in vertical alignment with the slots 20 and therefore form guides for the key wings so that they pass directly into the slots 20 of the valve, the ribbed faces of the key wings engaging the wing surfaces of the slots. It will of course be understood the wing faces of each owner differ in formation from the wing faces of any other owner so that only the person who has access to the pump or filling funnel of the owner can operate the valve to open or close.

When the stem 23 with the key wings is inserted as above described and the thread 25 is screwed into engagement with the thread 4°, the valve 16 is rotated in the same direction and by reason of its thread 16$^x$ and the thread 5° being in the opposite direction to the threads 25 and 4°, the valve 16 is screwed upward as the end 24 is screwed downward thereby raising the valve off its seat and opening the orifices 18 to permit liquid to be passed through the stem 23 and to beneath the open valve and through the orifices 18 into the container. By unscrewing the pump or funnel the valve 16 is automatically returned to its seat so that no other liquid could be passed into the tank.

From this description it will be seen that we have provided a means which will prevent passing of any fluid into the container other than that which it is intended by its owner to contain thereby protecting both the owner and the consumer, the owner having assurance that he will not lose the patronage of his customers due to their receiving a lower grade or watered fuel and the customer having assurance that he will receive the brand of fuel undiluted which the owner advertises for sale.

What we claim as our invention is:

The combination with a valve casing having an open upper end, an interiorly threaded intermediate portion and a laterally perforated lower end, an outer tube extending from the open upper end of the valve casing, an internally threaded member at the upper end of the outer tube and corresponding in pitch to the thread of the valve casing, a valve having a central opening extending axially therethrough, diametric recesses extending from the upper end of the central opening, an externally threaded portion engaging the thread of the casing, an inner tube, an externally threaded member at the upper end of the inner tube for engaging the thread at the upper end of the outer tube, and wing members extending diametrically from the opposite end of the inner tube to engage the diametric recesses of the valve.

WILLIAM JOHN OXLEY.
LEO MICHAEL FRANK.